United States Patent [19]

Yoda

[11] Patent Number: 4,706,236

[45] Date of Patent: Nov. 10, 1987

[54] SLICE LEVEL CORRECTOR

[75] Inventor: Yoshiro Yoda, Tama, Japan

[73] Assignee: Olympus Optical Co., Ltd., Tokyo, Japan

[21] Appl. No.: 826,040

[22] Filed: Feb. 4, 1986

[30] Foreign Application Priority Data

Feb. 8, 1985 [JP] Japan ................................ 60-23785

[51] Int. Cl.$^4$ ........................... G11B 5/09; G11B 5/02
[52] U.S. Cl. ......................................... 369/59; 360/67
[58] Field of Search ...................... 369/59; 360/43, 46, 360/67

[56] References Cited

U.S. PATENT DOCUMENTS 4,572,965 2/1986 Yamamura ........................... 369/59

Primary Examiner—Vincent P. Canney
Attorney, Agent, or Firm—Armstrong, Nikaido, Marmelstein & Kubovcik

[57] ABSTRACT

In a system in which a signal is read out of a medium for recording binary-coded information data, an information signal having no dc component is detected, and the information signal is compared with a slice signal to detect a series of binary-coded signals. The system includes a slice signal generating circuit for detecting an envelope of the information signal and generating a slice signal on the basis of the detected envelope signal such that the voltage level of the slice signal corresponds to a dc voltage level of the information signal when the information signal is being read and the voltage level thereof is higher than the noise level when the information signal is not being read.

4 Claims, 9 Drawing Figures

SLICE LEVEL CORRECTOR

BACKGROUND OF THE INVENTION

1. Field of the Invention

The present invention relates generally to a slice level corrector, and more specifically to a slice level corrector for an optical recording/reproducing system. The voltage level of a slice signal is corrected such that it is not influenced by noise when an information signal, which is read out of a recording medium, is detected as a series of binary-coded signals.

2. Description of the Prior Art

In optical systems for recording and reproducing digital information by irradiating a light beam on a disc type recording medium, for example, by using an optical pickup, both self-clock enabling frequency modulation (FM) systems and modified frequency modulation (MFM) systems have often been used. Recently, however, MFM systems have often been used because the systems can record data at a high density which is twice as great as in FM systems.

In the MFM system, however, an RC circuit is included in an information data reading circuit to eliminate the dc component from the information data signal read out of an optical disc with an optical pickup. The read information signal is superimposed upon a damping dc component and thus a series of binary-coded signals having different duty factors are detected. There is a problem however, in that error information may be detected. Further, the positive voltage level of the information signal does not match the negative voltage level thereof on the time base, so that there exists another problem in that different duty factors are produced due to the offset in the dc level. This causes an error in the information signal. Furthermore, when noise is superimposed upon the waveform when an information signal is absent, a false signal is generated which is mixed with the data signal.

SUMMARY OF THE INVENTION

It is the primary object of the present invention to provide a slice level corrector which can detect data signals having an accurate and uniform duty factor when recorded information data is detected in binary code by means of an optical pickup.

It is another object of the present invention to provide a slice level corrector which can prevent the detection of false signals due to noise when recorded information data is detected in binary code.

The present invention is directed to a slice level corrector comprising means for reading a signal from a recording medium, detecting an information signal having no dc component, and comparing the detected information signal with a slice signal to generate a series of binary-coded information signals. Means are provided for detecting an envelope of the read information signal and generating the slice signal on the basis of the detected envelope signal.

In the above slice level corrector, in order to detect the information signal read in binary code from the recording medium, the voltage level of the slice signal is corrected to correspond to a dc voltage level of the read information signal when the information signal is being read, but to be higher than that of noise when the information signal is not being read. To correct the voltage level of the slice signal, at least the positive-side envelope of the information signal is detected, and an appropriate slice level is determined on the basis of the detected envelope signal.

BRIEF DESCRIPTION OF THE DRAWINGS

The features and advantages of the slice level corrector according to the present invention will be more clearly appreciated from the following description taken in conjunction with the accompanying drawings in which.

DETAILED DESCRIPTION OF THE PREFERRED EMBODIMENTS

To facilitate understanding of the present invention, reference will be made to a prior art data reading circuit having a modified frequency modulation (MFM) system.

Figure 1:
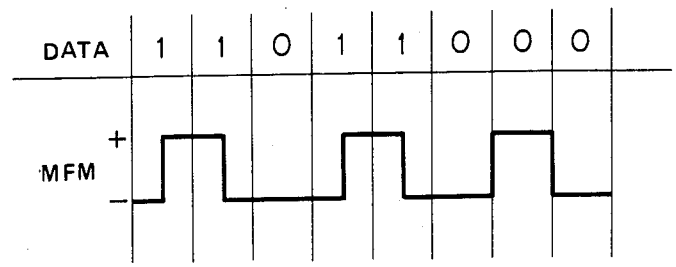
FIG. 1 is a diagram for explaining a recorded signal waveform in a MFM, system.

FIG. 1 shows an example of a recorded signal waveform of data "1 1 0 1 1 0 0 0" in an MFM system. In this system, a bit "1" represents "the presence of inversion" or change of state and a bit "0" represents "the absence of inversion" or no change of state. Further, a boundary between two bits of "0" is determined to be "the presence of inversion" or change of state.

Figure 2:
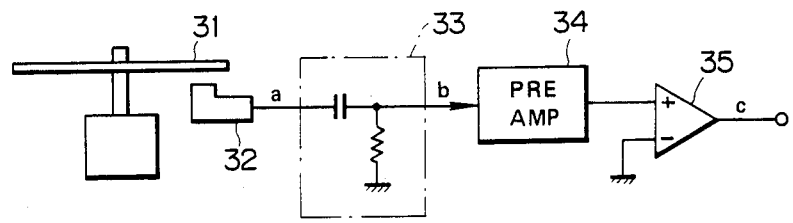
FIG. 2 is a schematic block diagram of a prior art data reading circuit.

FIG. 2 shows a prior art recorded information reading circuit, in which optical information data optically recorded in an optical disc 31 is read out by an optical pickup 32, converted into an electric signal corresponding thereto, and applied to a RC circuit 33 to eliminate a dc component included in the electric signal. The signal having no dc component is applied to a preamplifier 34 which amplifies the signal to an appropriate voltage level before input into a terminal (+) of a comparator 35. Since a terminal (−) of the comparator 35 is grounded, the signal output from the amplifier, 35 to the comparator 34 is sliced at a ground zero voltage level (i.e., reference level) for waveform shaping, and then output to the next stage.

Figure 3:
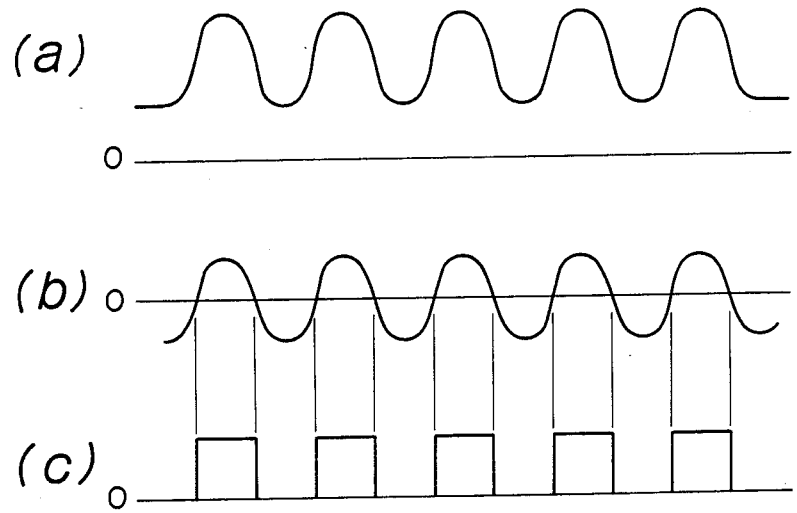
FIGS. 3(a) to (c) are diagrams showing signal waveforms in each section of the prior art circuit shown in FIG. 2.

FIG. 3(a) shows a signal waveform obtained at point a of the circuit shown in FIG. 2; FIG. 3(b) shows the signal obtained at point b thereof; and FIG. 3(c) shows the signal obtained at point c thereof, respectively. The figures indicate that a point a, a dc component is superimposed upon the read optical information signal; at point b the dc component is eliminated; and at point c the ac waveform is sliced at a zero level for waveform shaping.

Figure 4:
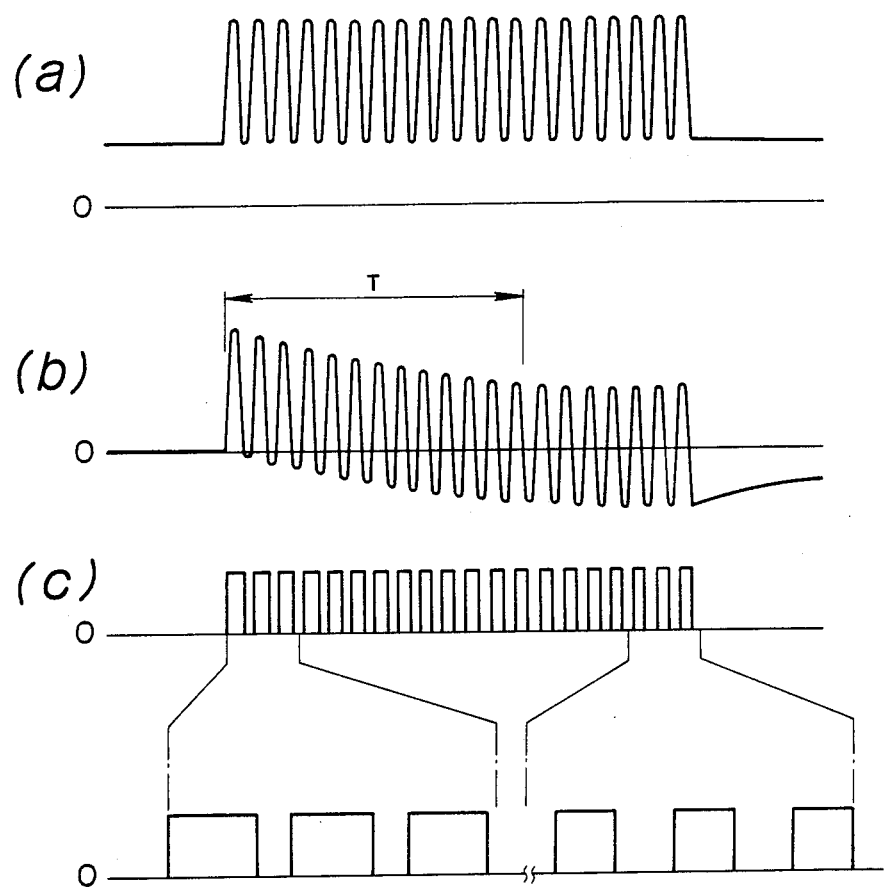
FIGS. 4(a) to (c) are also diagrams showing signal waveforms in each section of the prior art circuit shown in FIG. 2.
Figure 5:
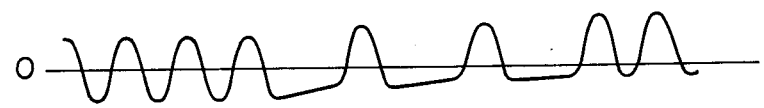
FIG. 5 is a diagram showing a signal waveform generated by the circuit shown in FIG. 2 for explaining problems involved in the prior art circuit.

Although the prior art circuit as shown in FIG. 2 operates as described above with reference to FIG. 3, when optically recorded information is read from the optical disc by an optical recording/reproducing system, in practice, the signals obtained at points a, b, and c have waveforms as shown in FIG. 4, respectively, because of the transient phenomena of the RC circuit 33. In more detail, at point a the information signal is, superimposed upon a constant dc component as shown in FIG. 4(a); at point b the information signal is superimposed upon a damping dc component, as shown in FIG. 4(b). As a result, at point c the output signal of the comparator 35 has different duty factors, that is, an inaccurate waveform as shown in FIG. 4(c). This results in the occurrence of erroneous information detection. Additionally, in the MFM system, the positive voltage level does not exactly match the negative voltage level on the time base, so that an inaccurate signal having different duty factors due to an offset in dc level will be generated at point b of the RC circuit 33. This additionally causes erroneous information detection.

Furthermore, when a noise component is superimposed upon the waveform when the read information signal is absent, the noise component vibrating near the zero voltage level is detected by the comparator 35, thus causing another problem in that a false signal may be generated which is mixed with a series of binary-coded data signals.

In view of the above description, reference is now made to a first embodiment of the slice level corrector according to the present invention.

Figure 6:
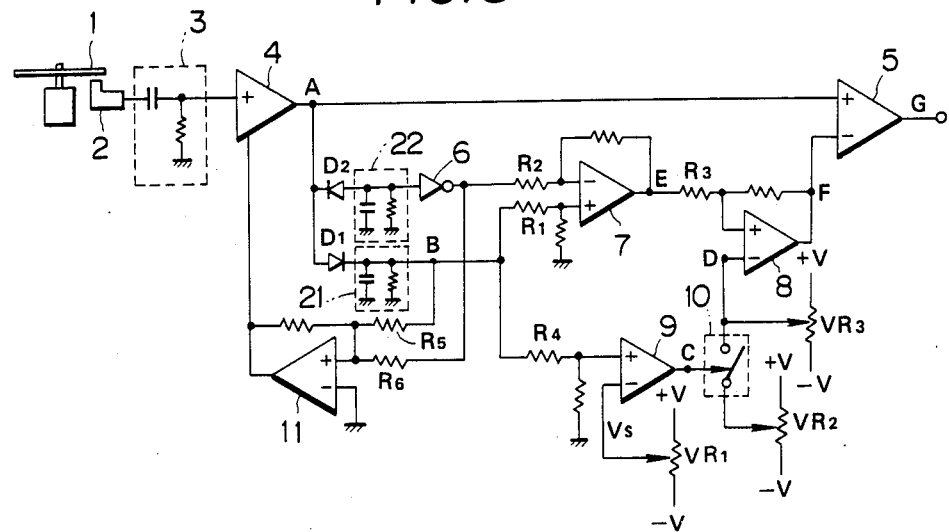
FIG. 6 is a schematic circuit diagram of a preferred embodiment of the slice level corrector according to the present invention.
Figure 7:
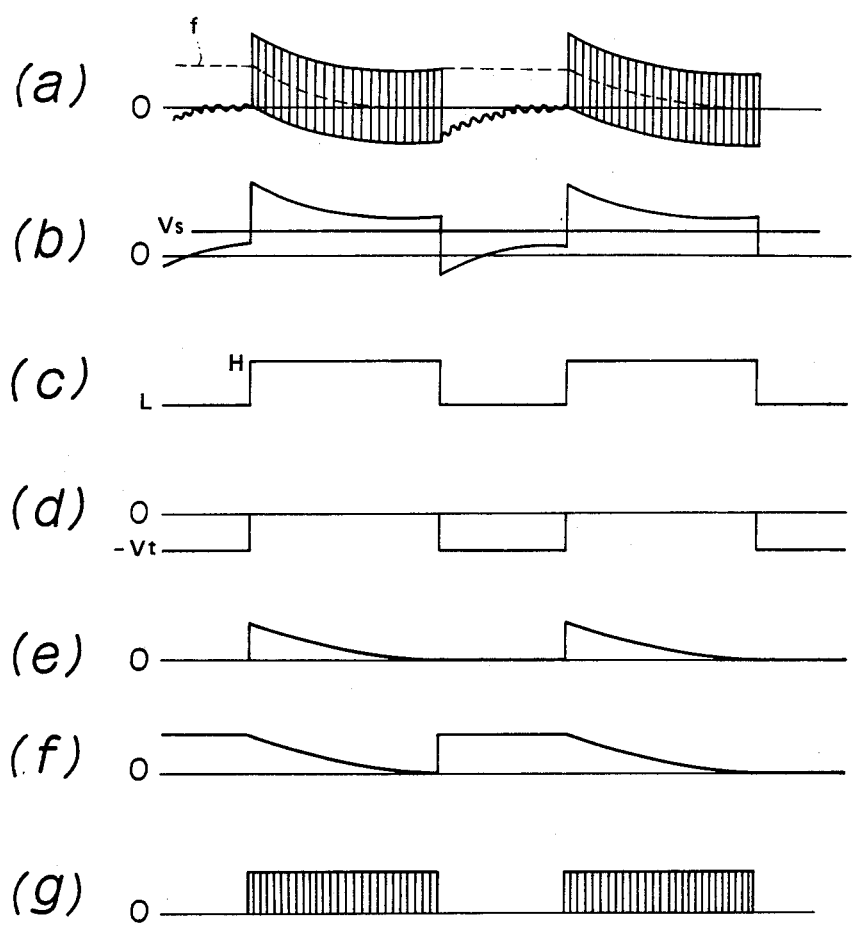
FIG. 7, consisting of a through g, is a timing chart of waveforms for explaining the operation of the circuit shown in FIG. 6.

FIG. 6 shows a data reading circuit incorporated in an optical recording/reproducing system, and FIG. 7 shows a timing chart or waveforms at each section of the circuit shown in FIG. 6. In the drawing, the reference numeral 1 denotes an optical disc formed with an optical recording layer, which is rotated by a disc motor. Optical information data recorded on the disc 1 is read by an optical pickup 2 and converted into an electric signal corresponding thereto by the pickup 2. The read electric signal is passed through a RC circuit 3 to eliminate the dc component and is then applied to a preamplifier 4 of automatic gain control (AGC) type. The output of the amplifier 4 is applied to a terminal (+) of a comparator 5 and compared with a slice signal applied to a terminal (−) thereof in order to produce a binary-coded data signal. A circuit for supplying a slice signal to the terminal (−) of the comparator 5 and a circuit for supplying a control signal to the AGC amplifier 4 is connected between the AGC amplifier 4 and the comparator 5.

In more detail, the anode of the diode D1 is connected to the output terminal A of the AGC amplifier 4. The cathode of diode D1 is connected to the (+) terminal of differential amplifier 7 through a smoothing circuit 21 and a resistor R1. Further, the cathode of diode D2 is connected to the output terminal A of the AGC amplifier 4. The anode of diode D2 is connected to the terminal (−) of the differential amplifier 7 through a smoothing circuit 22, an inverter 6 and a resistor R2. The output terminal E of the differential amplifier 7 is connected to the terminal (+) of a differential amplifier 8 through a resistor R3. The output point B of smoothing circuit 21 is connected to the terminal (+) of a comparator 9 through a resistor R4, and a voltage Vs which has been divided by a variable resistor VR1 is applied to the terminal (−) of the comparator 9 to set the comparator 9 to a predetermined voltage level. The variable resistor VR1 is connected between two voltage supplied +V and −V. The output terminal C of the differential amplifier 9 is connected to a control terminal of a switch circuit 10, which is turned on in response to a low-voltage (L) level signal from the comparator 9. A voltage divided by a variable resistor VR2 is applied to one terminal of the switch circuit 10. The other terminal of the circuit 10 is connected to the terminal (−) of the differential amplifier 8, to which a voltage (near zero level) divided by a variable resistor VR3 is applied. Therefore, a slice signal can be obtained at the output terminal F of the differential amplifier 8 and the slice signal is applied to the terminal (−) of the comparator 5, so that a binary-coded data signal can be output from the output terminal G of the comparator 5.

Further, the output point B of the smoothing circuit 21 is connected to the terminal (+) of a differential amplifier 11 through a resistor R5; an output terminal of an inverter 6 is also connected to the terminal (+) of the differential amplifier 11 through a resistor R6; and the terminal (−) of differential amplifier 11 is grounded. Thus a control signal from the output terminal of the amplifier 11 is supplied to the control terminal of the AGC amplifier 4.

The operation of the above circuit will be described with reference to FIG. 7.

Digital information data recorded on the optical disc 1 is read by the pickup 2. A dc component of the read information signal is eliminated by the RC circuit 3, and only the ac signal is amplified by the AGC amplifier 4. An information signal having a waveform as shown in FIG. 7(a) is obtained at the output point A of the amplifier 4. In the read information signal, an ac component is superimposed upon a dc component which is damped by the RC circuit 3 and further a noise component is superimposed upon the signal when the information data signal is absent.

The positive-side envelope of the information signal is detected by the diode D1 and the smoothing circuit 21, so that an envelope signal having a waveform as shown in FIG. 7(b) is obtained at the output of point B of the smoothing circuit 21. This positive side envelope signal is applied to the terminal (+) of the differential amplifier 7.

Further, the negative-side envelope of the information signal is detected by the diode D2 and the smoothing circuit 22; inverted by the inverter 6, and is applied to the terminal (−) of the differential amplifier 7. The difference in voltage level between the positive- and negative-side envelope signals is obtained by the differential amplifier 7, so that a signal having a waveform as shown in FIG. 7(e) is applied from the output terminal E to the terminal (+) of the differential amplifier 8.

On the other hand, the positive-side envelope signal obtained at the output point B of the smoothing circuit 21 as shown in FIG. 7(b) is applied to the terminal (+) of the comparator 9 and is compared with the preset voltage Vs, so that a control signal having a waveform as shown in FIG. 7(c) is obtained at the output C of the comparator 9. This control signal is applied to the switch circuit 10 to turn it on in response to a low level of the control signal. In the circuit 10, the divided voltage level of the variable resistor VR2 is set to a minus value −Vt and the variable resistor VR3 is set to approximately a zero value. Therefore, the voltage level of the input point D of the differential amplifier 8 is roughly at −Vt when the switch circuit 10 is on and at zero when the switch circuit 10 is off. As a result, a slice signal as shown in FIG. 7(f) is output from the output terminal F of the differential amplifier 8, which corresponds to a difference in voltage level between the signal waveform at point E shown in FIG. 7(e) and at point D shown in FIG. 7(d). This slice signal F is at a high level when the information signal shown in FIG. 7(a) is absent, but the voltage level thereof gradually decreases when the information signal is present.

In the comparator 5, the signal at point A shown in FIG. 7(a) is compared with the slice level signal at point F shown in FIG. 7(f), so that it is possible to detect a series of sliced information data signals at point G as shown in FIG. 7(g) without including any noise component. Further, the positive- and negative-side envelope signals are applied to the differential amplifier 11 and the output thereof is fed back to the AGC amplifier 4 to automatically control the gain thereof.

Further, in the circuit shown in FIG. 6, where the differential amplifier 8 is removed and the output obtained at the output terminal D of the switch circuit 10 is applied via an inverter to the terminal (+) of the differential amplifier 7 together with the positive-side envelope signal, the slice signal as shown in FIG. 7(f) can be obtained at the output terminal E of the amplifier 7. In this case, however, the inverter connected to the output terminal D is unnecessary if the divided voltage level of the variable resistor VR2 is set to a positive level of +Vt. In the above modification of the first embodiment, the comparator 7 generates the slice signal from the output terminal E thereof on the basis of a difference in voltage level between the signal obtained by adding the reference voltage switched by the switching circuit 10 to the detected positive-side envelope signal at the terminal (+) of the comparator 7 and the negative-side envelope signal applied to the terminal (−) of the comparator 7.

Figure 8:
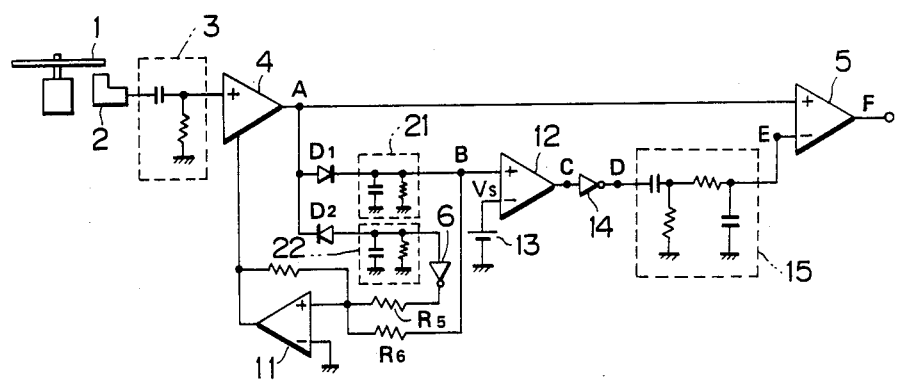
FIG. 8 is a schematic circuit diagram of another embodiment of the slice level corrector according to the present invention.
Figure 9:
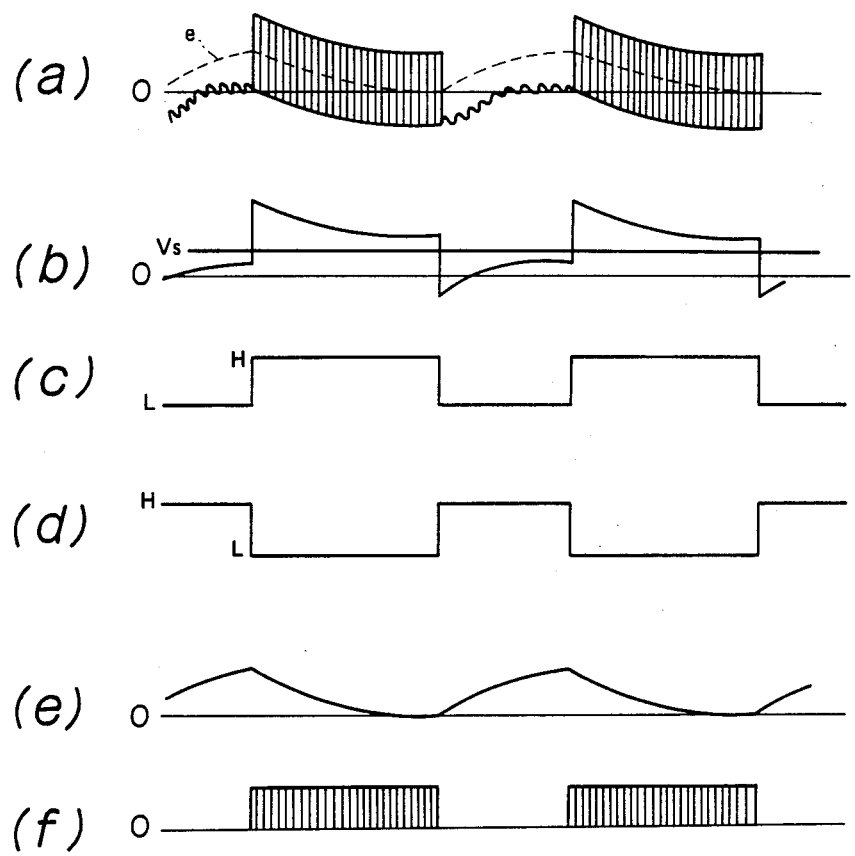
FIG. 9, consisting of a through f, is a timing waveforms for explaining the operation of the circuit shown in FIG. 8.

FIG. 8 shows the circuit configuration of another embodiment of the present invention and FIG. 9 shows waveforms for explaining the operation thereof. The circuit shown in FIG. 8 is the same as that shown in FIG. 6 except for the slice level corrector.

The slice level corrector shown in FIG. 8 is configured as follows: The anode of the diode D1 is connected to the output terminal A of the AGC amplifier 4 and the cathode thereof is connected to the terminal (+) of a comparator 12 through the smoothing circuit 21. A voltage supply 13 of a reference voltage Vs is connected to the terminal (−) of the comparator 12. The output terminal C of the comparator 12 is connected to an inverter 14, and the output terminal D of the inverter 14 is connected to the terminal (−) of the comparator 5 via an integrator 15.

The operation of the circuit shown in FIG. 8 will be described with reference to FIG. 9. An information signal read from the disc 1 by the optical pickup 2 is passed through the RC circuit 3 to eliminate the dc component and is applied to the AGC amplifier 4, so that the information signal as shown in FIG. 9(a) is obtained at the output terminal A of the amplifier 4. This signal has a waveform in which the dc component is gradually decreased by the RC circuit 3 and the noise component is superimposed upon the signal when the information signal is absent. The positive-side envelope of the information signal is detected by the diode D1 and the smoothing circuit 21, so that the positive-side envelope signal as shown in FIG. 9(b) is obtained at the output point B of the smoothing circuit 21. This envelope signal is compared with the reference voltage Vs by the comparator 12 which produces a signal having a waveform as shown in FIG. 9(c) at the output terminal C thereof. The signal at point C is inverted through an inverter 14, and a signal as shown in FIG. 9(d) is obtained at the output terminal D of the inverter. In FIG. 9(d), the symbol H denotes a high voltage level and L denotes a low-voltage level. The signal shown in FIG. 9(d) is integrated by the integrator 15 and a slicing signal as shown in FIG. 9(e) is obtained at point E of the integrator 15. The information signal shown in FIG. 9(a) is compared with the slice level signal shown in FIG. 9(e) in comparator 5, so that it is possible to detect a series of sliced information data signals as shown in FIG. 7(f) without including the noise component at the output terminal F of the comparator 5.

In the above two embodiments, the positive-side envelope signal is detected to determine the slicing level; however, it is also possible to determine the slicing level on the basis of the negative-side envelope signal.

In the above embodiments, the slice level corrector according to the present invention is applied to the reading circuit incorporated in an optical recording/reproducing system including an optical disc apparatus or a photomagnetic disc apparatus. However, without being limited to an optical recording/reproducing system, it is also possible to apply the corrector according to the present invention to electrostatic recording/reproducing systems used for video or audio discs or to signal detection circuits in magnetic disc recording/reproducing systems.

As described above, in the slice level corrector according to the present invention, since the slice signal is generated so as to have different voltage levels when a reproduced information signal is present and when a reproduced information signal is absent but noise is superimposed, and since the slice level when the reproduced signal is present is determined to match the dc component of the reproduced signal and slice level of when the reproduced signal is absent, it is possible to detect binary-coded information having an accurate duty factor and to prevent the detection of false information due to noise. Therefore, it is possible to prevent an erroneous operation when the detected binary-coded information signals are processed.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A slice level corrector, comprising:
    (a) transducer means for reading a signal from a medium in which binary-coded information is recorded;
    (b) detecting means coupled to said transducer means for detecting an information signal having no dc component;
    (c) first comparator means coupled to said detecting means for comparing the detected information signal with a slice signal to generate a series of binary-coded information signals; and (d) envelope detecting means for detecting the envelope of the information signal and for generating the slice signal in accordance with the detected envelope signal such that the voltage level of the slice signal corresponds to the dc voltage level of the information signal when the information signal is detected.

2. The slice level corrector as set forth in claim 1, wherein said envelope detecting means comprises:
   (a) a first detecting circuit means for detecting a positive-side envelope of the information signal;
   (b) a second detecting circuit means for detecting a negative-side envelope of the information signal;
   (c) a first difference circuit means coupled said first and second detecting circuit means for generating a difference signal between the positive-side envelope signal and the negative-side envelope signal;
   (d) a slicing circuit means coupled to said first detecting circuit means, for slicing the positive-side envelope signal at a constant voltage level and providing a switching signal in accordance therewith;
   (e) a switching circuit means coupled to said slicing circuit means, for switching a reference voltage in accordance with the switching signals; and
   (f) a second difference circuit means coupled to said first difference circuit means and said switching circuit means, for generating the slice signal on the basis of a difference in voltage level between the signal generated by said first differential circuit means and the reference voltage switched by said switching circuit means.

3. The slice level corrector as set forth in claim 1, wherein said envelope detecting means comprises:
   (a) a first detecting circuit means for detecting a positive-side envelope of the information signal;
   (b) a second detecting circuit means for detecting a negative-side envelope of the information signal;
   (c) comparator means coupled to said first and second detecting circuit means for comparing the output of said positive- and negative-side envelopes of the information signal;
   (d) a slicing circuit means coupled to said first detecting circuit means, for slicing the positive-side envelope signal at a constant voltage level and providing a switching signal in accordance therewith;
   (e) a switching circuit means coupled to said slicing circuit means, for switching a reference voltage on the basis of the switching signal; and
   (f) a differential circuit means coupled to said switching circuit means and said comparator means, for generating the slice signal in accordance with a difference in voltage level between the reference voltage switched by said switching circuit means and the comparison of the positive-side envelope signal and the negative-side envelope signal.

4. The slice level corrector as set forth in claim 1, wherein said envelope detecting means comprises:
   (a) detecting circuit means for detecting a positive-side envelope of the information signal;
   (b) a slicing inverter circuit means coupled to said detecting circuit means for slicing the positive-side envelope signal at a constant voltage level and inverting the sliced signal; and
   (c) an integrating circuit means coupled to slicing inverter circuit means for integrating the sliced inverted signal and providing the integrated signal as the slice signal.

* * * * *